(12) United States Patent
Dini et al.

(10) Patent No.: US 7,853,683 B1
(45) Date of Patent: Dec. 14, 2010

(54) APPROACH FOR CANCELING EVENTS

(75) Inventors: Petre Dini, San Jose, CA (US); Jackson Shyu, Fremont, CA (US); Cosmin Dini, San Jose, CA (US); Manuela Popescu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1447 days.

(21) Appl. No.: 10/210,471

(22) Filed: Jul. 31, 2002

(51) Int. Cl.
*G06F 15/173* (2006.01)
*G06F 3/00* (2006.01)

(52) U.S. Cl. .................. 709/224; 709/202; 709/225; 719/318

(58) Field of Classification Search .............. 702/202, 702/225, 232; 719/318; 709/224, 202, 225
See application file for complete search history.

(56) References Cited

U.S. PATENT DOCUMENTS

| | | | |
|---|---|---|---|
| 5,283,856 A * | 2/1994 | Gross et al. ............... 706/47 |
| 5,721,825 A * | 2/1998 | Lawson et al. ............. 709/203 |
| 6,038,563 A * | 3/2000 | Bapat et al. ............... 707/10 |
| 6,125,392 A | 9/2000 | Labatte et al. |
| 6,321,338 B1 * | 11/2001 | Porras et al. .............. 726/25 |
| 6,631,363 B1 * | 10/2003 | Brown et al. .............. 707/1 |
| 7,010,586 B1 * | 3/2006 | Allavarpu et al. .......... 709/223 |
| 7,143,417 B2 * | 11/2006 | Myers ...................... 719/318 |
| 2002/0042847 A1 * | 4/2002 | Takats et al. ............... 709/316 |
| 2003/0167326 A1 * | 9/2003 | de Bonet .................. 709/224 |
| 2008/0065764 A1 * | 3/2008 | Huang et al. .............. 709/224 |

FOREIGN PATENT DOCUMENTS

GB 2362288 A * 11/2001

* cited by examiner

*Primary Examiner*—Patrice L Winder
*Assistant Examiner*—Asghar Bilgrami
(74) *Attorney, Agent, or Firm*—Hickman Palermo Truong & Becker LLP

(57) ABSTRACT

An approach for processing events generally involves receiving event data that specifies one or more attributes of an event that has occurred. A determination is made whether the event data satisfies one or more event cancellation criteria. If so, then event report data is provided to a recipient, such as an application layer. The event report data specifies at least one attribute of the event that occurred. If the event data does not satisfy the one or more event cancellation criteria, then the event data is not provided to the recipient and the event is canceled. The cancellation criteria may include policy-based rules that may specify event cancellation based upon, for example, event frequency, correlation window size, particular information associated with an event, or other management application rules. The particular cancellation criteria used may vary from application to application. Furthermore, the cancellation criteria used for any particular application may be dynamic and change over time.

12 Claims, 5 Drawing Sheets

APPROACH FOR CANCELING EVENTS

FIELD OF THE INVENTION

This invention relates generally to event-based information systems and more specifically, to an approach for canceling events.

BACKGROUND OF THE INVENTION

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

In the context of event-based information systems, an event is represented by event data that defines one or more attributes of a detected condition, for triggering an information to be sent, i.e., an event. For example, event data may define the type of condition that was detected, as well as a time at which the condition was detected.

Most event-based information systems include some type of event processing mechanism for processing event data and determining what actions, if any, are to be performed in response to events. Event processing mechanisms typically include built-in or "hard coded" logic that specifies one or more actions to be taken in response to the occurrence of a particular event. Event processing mechanisms may themselves perform a specified action. Sometimes, event processing mechanisms notify other software applications that an event has occurred so that the other software applications may act on the event. For example, an event processing mechanism may notify a network management software application, executing at a Network Operations Center (NOC), that an event has occurred to allow the network management software to notify administrative personnel of the existence of an event, e.g., through a Graphical User Interface (GUI).

One important aspect of event processing is event cancellation, upon a condition has been considered either solved or pending. Event cancellation refers to situations where an event processing mechanism determines that an event is to be cancelled, instead of being acted on or reported to another entity, such as a higher software layer in a hierarchical system. Canceling an event may also involve an event processing mechanism requesting that the source of the event, i.e., the entity that generated and provided the event data to the event processing mechanism, cancel the event. The source mechanism may then clear the event in response to the request, for example by deleting a record of the event from its local storage.

Event cancellation may occur for a variety of reasons, depending upon the requirements of a particular application. Sometimes, the condition that was the basis of an event may have changed and is no longer valid for the event. Some events become subordinate to other events with higher priorities, which when processed, make it unnecessary to process the subordinate events. Other events are automatically canceled by an event processing mechanism after a specified amount of time has elapsed from the time the event occurred (so-called "by default" cancellation).

One of the significant issues with conventional event processing is that the criteria used for determining when an event is to be canceled are often embedded or "hard coded" into the processing logic of event processing mechanisms. For example, a set timer may be used to cancel "old" events after a specified period of time. As another example, certain type of events may be cancelled under specified conditions. This type of implementation causes two types of problems.

First, embedded cancellation criteria are generally inflexible and do not work well in dynamic computing environments. For example, one of the most common event cancellation criteria employed is time expiration, which although is relatively straightforward to implement, is not well suited for a large number of applications, as the source of an event may not have a complete view on the state of the entire system. Many applications may require event cancellation policies that are specific to a particular context or customer and are therefore not easily implemented in an embedded event cancellation environment.

Second, it can be difficult to change event cancellation criteria that have been embedded into the processing logic of event processing mechanisms. When a change is required, the event processing mechanisms that need to be updated have to be identified, which may be a complex task. Some distributed computing systems may have thousands of instances of event processing mechanisms that need to be examined. Then the identified event processing mechanisms have to be updated and verified, which may consume a considerable amount of manual resources.

Based upon the foregoing, there is a need for an approach for canceling events that does not suffer from the limitations in prior approaches. There is a particular need for an approach for canceling events that is more flexible in determining whether events are to be canceled.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. POLICY-BASED EVENT CANCELLATION
III. STATE-BASED EVENT CANCELLATION
IV. IMPLEMENTATION MECHANISMS

I. Overview

An approach for processing events generally involves receiving event data that specifies one or more attributes of an event that has occurred. A determination is made whether the event data satisfies one or more event cancellation criteria. If so, then event report data is provided to a recipient, such as an application layer. The event report data specifies at least one attribute of the event that occurred. If the event data does not satisfy the one or more event cancellation criteria, then the event data is not provided to the recipient and the event is canceled.

According to one embodiment, the cancellation criteria may include cancellation policies or policy-based rules that specify event cancellation based upon, for example, time, event frequency, correlation window size, particular information associated with an event, or other management application rules. The particular cancellation criteria used may vary from application to application. Furthermore, the cancellation criteria used for any particular application may be dynamic and change over time. Thus, the approach is very flexible and allows an event cancellation mechanism to user different cancellation criteria and policies in different situations.

II. Policy-Based Event Cancellation

Figure 1:
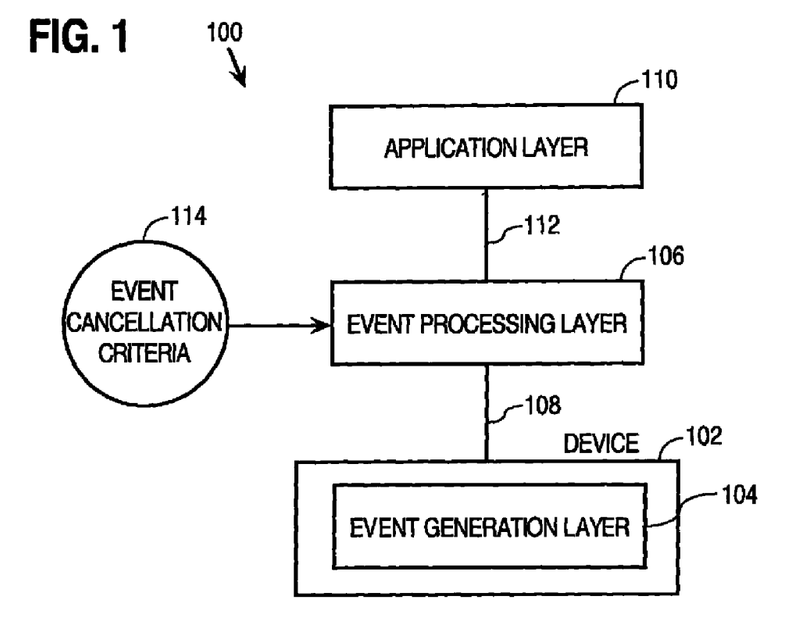
FIG. 1 is a block diagram of a network arrangement on which an approach for canceling events may be implemented according to an embodiment.

FIG. 1 is a block diagram of a network arrangement 100 on which an approach for canceling events may be implemented according to an embodiment. A device 102 includes an event generation layer 104 that is configured to generate event data that defines one or more attributes of an event. Although event generation layer 104 is depicted in FIG. 1 as part of device 102, event generation layer 104 may also be separate from device 102, depending upon the requirements of a particular application. Examples of device 102 include, without limitation, a network element, such as a switch, router, hub, workstation, or server. The approach for canceling events is also applicable to applications where event generation layer 104 is embodied in, or where event generation occurs in, a software element, such as a software layer, operating system or device driver.

Device 102 is communicatively coupled to an event processing layer 106 via a link 108. Event processing layer 106 is configured to process event data received from event generation layer 104 and generate and provide event reporting data to an application layer 110 over a link 112. The event reporting data may include none, part or all of the event data received from event generation layer 104. The event reporting data may also include other data that was not part of the event data received from event generation layer 104.

Application layer 110 processes the event reporting data received from event processing layer 106 and performs any appropriate action, such as notifying administrative personnel. An example of application layer 110 is a management software application that provides for the exchange of information with administrative personnel via a GUI.

According to one embodiment, event processing layer 106 is configured to cancel events based upon event cancellation criteria 114, that are stored and managed separate from the event processing layer. Event cancellation criteria 114 may include any type of data or information that may be used by event processing layer 106 to determine whether an event should be canceled, i.e., whether the event should be reported to application layer 110. Example cancellation criteria include, without limitation, policy rules, management application rules, business rules and cancellation logic.

Event cancellation criteria 114 may be provided to, or received by, event processing layer 106 from any source, such as a policy creation or management application, that is responsible for creating and managing policies that may be applied to event cancellation. Event cancellation criteria 114 may be stored locally by event processing layer 106, e.g., on a non-volatile storage device, or provided to event processing layer 106 from another location on an as-needed basis. For example, event cancellation criteria 114 may be stored in a database management system or in a policy management server or application. Event processing layer 106 may periodically request new cancellation criteria 114, or new cancellation criteria 114 may be periodically provided to event processing layer 106, so as to periodically reconfigure event processing layer 106.

Figure 2:
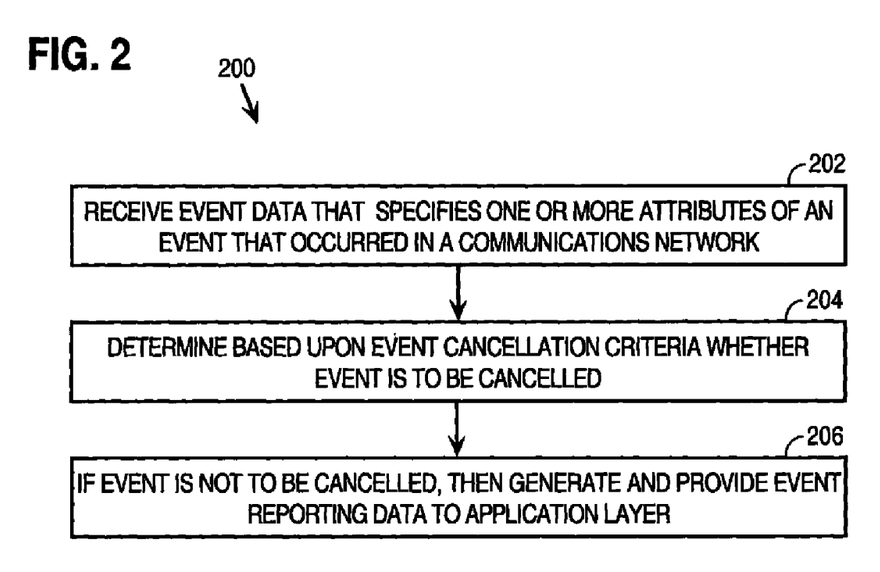
FIG. 2 is a flow diagram that depicts an approach for canceling events.

FIG. 2 is a flow diagram 200 that depicts an approach for canceling events according to an embodiment. Referring also to FIG. 1, in step 202, event processing layer 106 receives event data from event generation layer 104 that specifies one or more attributes of an event that has occurred in a communications network.

In step 204, event processing layer 106 determines, based upon event cancellation criteria 114, whether the event defined by the event data is to be cancelled. According to one embodiment, event processing layer 106 makes this determination by evaluating the event data against the event cancellation criteria. If the event data satisfies the event cancellation criteria, then event processing layer 106 cancels the event. In this context, canceling the event means that event processing layer 106 does not report the event to application layer 110. More specifically, event processing layer 106 does not generate and provide event reporting data to application layer 110 for this event.

According to another embodiment, event processing layer 106 is further configured to generate and send to device 102 a cancellation request, if the event data satisfies the event cancellation criteria. The cancellation request causes device 102 to perform some form of cancellation processing on the event corresponding to the event data. This may include, for example, device 102 deleting the event data or other data to clear the event from device 102. The cancellation request, and cancellation processing, may take any form and the invention is not limited to a particular form of the request or processing.

If, in step 204, event processing layer 106 determines that the event data does not satisfy the event cancellation criteria, then the event is not to be cancelled and in step 206, event processing layer 106 generates and provides event reporting data to application layer 110. According to one embodiment, the event reporting data includes at least one of the one or more attributes from the event data that defines the event, or sufficient data to allow application layer 110 to process the event.

For purposes of explanation, links 108, 112 are depicted in the figures as direct connections. Links 108, 112, may however, be implemented by any medium or mechanism that provides for the exchange of data between device 102, event processing layer 106 and application layer 110. Examples of links 108, 112 include, without limitation, a network such as a Local Area Network (LAN), Wide Area Network (WAN), Ethernet or the Internet, or one or more terrestrial, satellite or wireless links. For purposes of brevity, links 108, 112 are depicted in FIG. 1 as direct connections between device 102, event processing layer 106 and application layer 110. However, links 108, 112 do not have to be physically direct links and may involve connections through any number of network elements, for example network switches, hubs and routers that are not depicted in FIG. 1. Furthermore, depending upon a particular implementation, links 108, 112 may not be physical connections, but rather routine calls or any other mechanisms used by computer software routines to exchange information.

Device 102, event processing layer 106 and application layer 110 may be implemented on a single computing node or device, or may reside on separate nodes, for example in a distributed computing environment, depending upon the requirements of a particular application, and the invention is not limited to any particular implementation or context. Furthermore, although event generation layer 104, event processing layer 106 and application layer 110 are depicted and described herein as separate "layers" for purposes of explanation, these elements may be implemented either separately or together in computer hardware, computer software, or a combination of computer hardware and software, depending upon the requirements of a particular application, and the invention is not limited to any particular implementation.

Event processing layer 106 may be configured as an event processing "engine" to process events using event cancellation criteria or event cancellation rules. In this situation, event cancellation criteria 114 may include a set of cancellation criteria or cancellation rules that are provided to and processed by event processing layer 106. This approach provides complete flexibility, since in a system or application with multiple event processing layers 106, each event processing layer 106 may be provided with its own set of cancellation criteria or cancellation rules.

Figure 3:
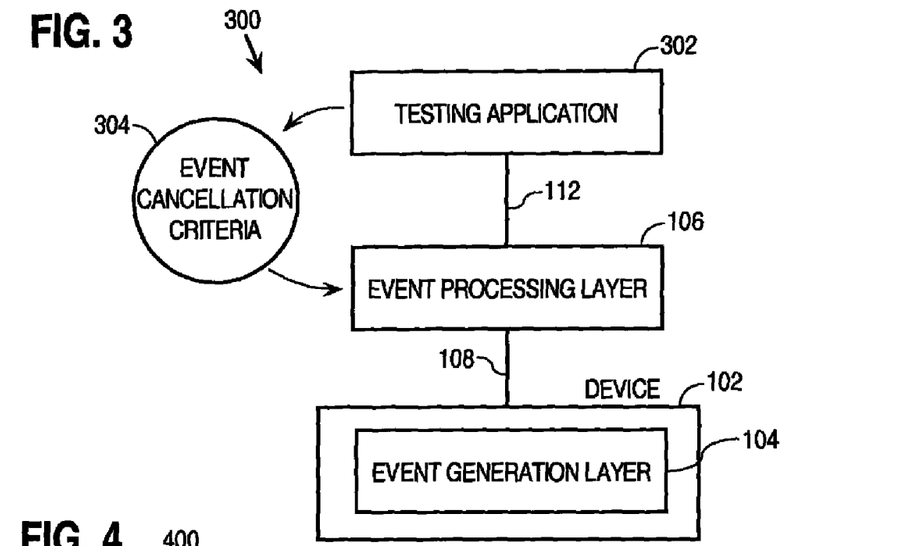
FIG. 3 is a block diagram that depicts an example arrangement for canceling events.

FIG. 3 is a block diagram that depicts an example arrangement 300 for canceling events according to an embodiment. In this arrangement, event processing layer 106 reports events from device 102 to a testing application 302 over link 112. In this example, testing application 302 is performing tests on device 102. For example, device 102 may be a new version of a networking switch. It is known a priori that the testing of device 102 will cause error events to occur. It is desirable to suppress reporting of certain known error events that are not needed for the testing, while allowing the reporting of other specified error events that are important for the testing. Accordingly, testing application 302 provides event cancellation criteria 304 to event processing layer 106. When event processing layer 106 processes events from device 102 using event cancellation criteria 304, the desired events are reported to testing application 302, while the undesired events are cancelled and not reported to testing application 302.

This approach allows event processing layer 106 to be implemented as a generic event processing "engine" that is configured to process events according to event cancellation criteria 304. The event cancellation criteria 304 may be selectively specified for each particular device 102 to be tested, depending upon the requirements of a particular test. For example, event cancellation criteria 304 may specify particular errors that are to be cancelled for a particular device. As another example, event cancellation criteria 304 may also specify event processing logic and rules to be applied by event processing layer 106.

Event cancellation criteria may be periodically updated to change event processing. In the present example, event cancellation criteria 304 may be updated in response to testing application 302 performing different testing of device 102 that requires different event cancellation. This allows event processing layer 106 to be dynamically re-configured to reflect changing requirements of testing application 302.

Figure 4:
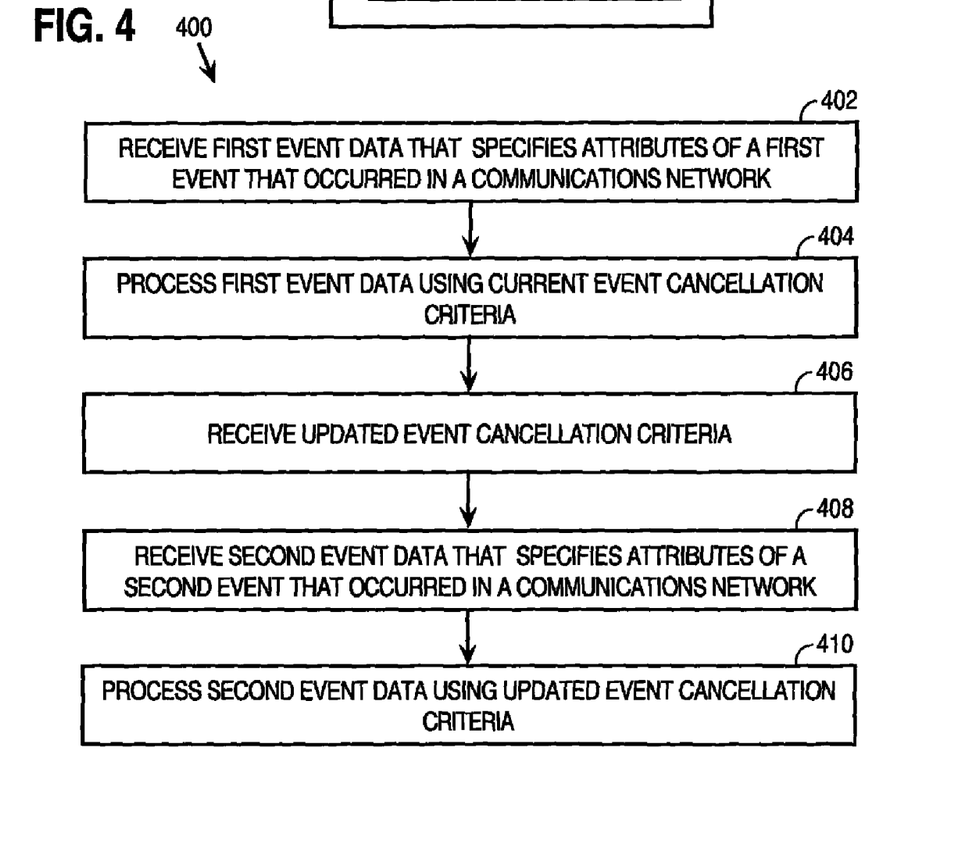
FIG. 4 is a flow diagram that depicts an approach for dynamically updating event cancellation criteria.

FIG. 4 is a flow diagram that depicts an approach for dynamically updating event cancellation criteria to reflect changes in desired event cancellation. The approach is depicted and described from the perspective of testing application 302 performing testing on device 102 in a communications network, but the invention is not limited to this particular example or context. For example, the approach is applicable to customer care and customer agreement applications, where the ability to dynamically configure event processing mechanisms for a particular environment or context is particularly valuable.

In step 402, event processing layer 106 receives first event data that specifies one or more attributes of a first event that occurred at device 102 in a communications network. In step 404, event processing layer 106 processes the first event data using current cancellation criteria, e.g., event cancellation criteria 304. If the first event data satisfies the current cancellation criteria, then the first event is cancelled and is not reported to testing application 302. If the first event data does not satisfy the current cancellation criteria, then the first event is not cancelled and is reported to testing application 302.

As previously described herein, testing application 302 may determine that certain types of error events are to be suppressed and cancelled by event processing layer 106 to avoid unnecessary reporting of errors. Accordingly, when processed by event processing layer 106, the current event cancellation criteria cause the cancellation of the particular error events that are not to be reported to testing application 302.

In step 406, event processing layer 106 receives updated event cancellation criteria. In this situation testing application 302 may have initiated a different type of testing and desires to change the particular error events that are cancelled and not reported to testing application 302. The updated event cancellation criteria reflect the desired change in event processing. Event processing layer 106 may receive the updated cancellation criteria from any source, e.g., from testing application 302, or from a repository such as a database management system.

In step 408, event processing layer 106 receives second event data that specifies one or more attributes of a second event that occurred at device 102 in a communications network. In step 410, event processing layer 106 processes the second event data using the updated cancellation criteria. If the second event data satisfies the updated cancellation criteria, then the second event is cancelled and is not reported to testing application 302. If the second event data does not satisfy the updated cancellation criteria, then the second event is not cancelled and is reported to testing application 302.

The use of the present approach for canceling events in the context of a testing environment is only one example of the many possible applications of the approach. Other example applications include network management, login schemes and auditing functions.

The approach described herein for canceling events is also applicable to situations where a particular event processing layer has existing event processing capabilities, but it is desirable to maintain and supplement those abilities with additional criteria. Referring to the prior example, suppose that event processing layer 106 is currently configured to perform event cancellation based upon a current set of event cancellation logic and event cancellation criteria. The existing capabilities of event processing layer 106 may be supplemented using event cancellation criteria 304 to provide additional event processing capabilities to event processing layer 106.

The approach described herein for canceling events may be used in situations where the event cancellation criteria includes an operator request to cancel an event. For example, testing application 302 may include a GUI to enable administrative personnel to manage events occurring in arrangement 300. More specifically, the GUI enables administrative personnel to specify particular events that are to be cancelled, for example by selecting and de-selecting GUI objects that correspond to particular types of events. In this situation, the particular events that are to be cancelled are specified in event cancellation criteria 304.

The additional event processing may cause an event that would not have been cancelled by event processing layer 106 using the existing criteria to be cancelled and not reported to testing application 302. Alternatively, the additional event processing may cause an event, which would have been cancelled by event processing layer 106 using the existing criteria, not to be cancelled and to be reported to testing application 302. Thus, default cancellation criteria can be overridden by event cancellation criteria 304. In the prior example in the testing context, there may be situations where, for testing purposes, it is desirable not to cancel an event that would ordinarily be cancelled, based upon the existing cancellation criteria used by event processing layer 106. In this situation, event cancellation criteria 304 may be used to override the existing cancellation criteria so that the event is not cancelled and so that the event data may be used by testing application 302.

Figure 5:
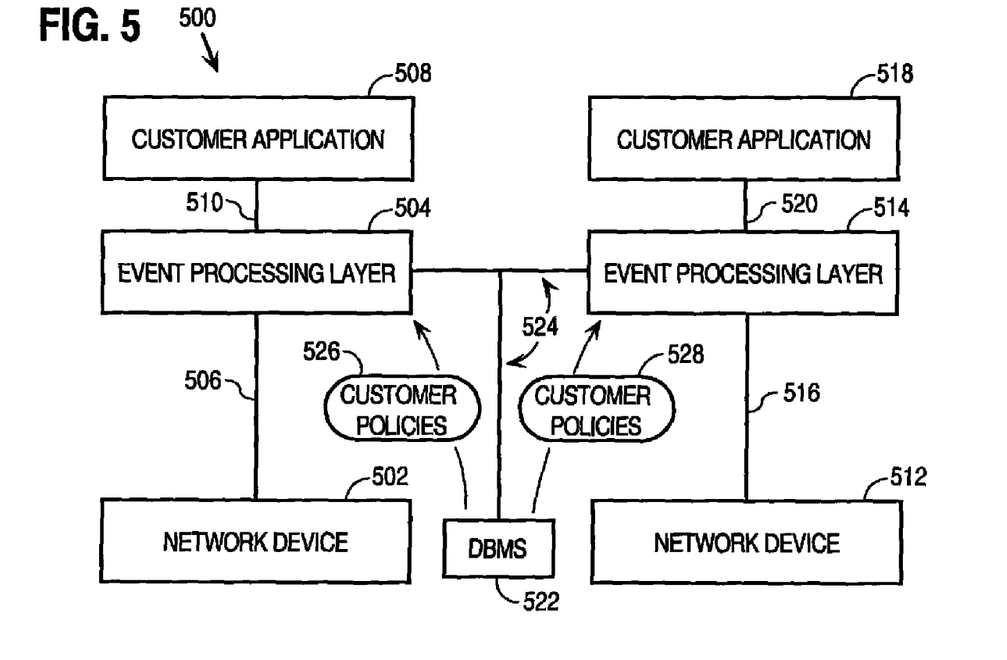
FIG. 5 is a block diagram that depicts an arrangement for canceling events using customer policies.

FIG. 5 is a block diagram that depicts an arrangement 500 for canceling events based upon customer policies according to an embodiment. A network device 502 is communicatively coupled to an event processing layer 504 via a link 506. Event processing layer 504 is communicatively coupled to a customer application 508, associated with a first customer, via a link 510. A network device 512 is communicatively coupled to an event processing layer 514 via a link 516. Event processing layer 514 is communicatively coupled to a customer application 518, associated with a second customer, via a link 520.

Event processing layers 504, 514 are communicatively coupled to a Database Management System (DBMS) 522 via links 524. DBMS 522 stores customer policies and business rules that are used by event processing layers 504, 514 to process events generated by network devices 502, 512. As with links 108, 112, links 506, 510, 516, 520, 524 may be implemented by any medium or mechanism that provides for the exchange of data between their respective elements, i.e., network devices 502, 512, event processing layers 504, 514, customer applications 508, 518 and DBMS 522. A policy server or policy management application may be used as an alternative to DBMS 522 as a policy data repository.

According to one embodiment, event processing layers 504, 514 are generic event processing engines configured to process events via customer policies retrieved from DBMS 522. More specifically, event processing layer 504 retrieves customer policies 526, associated with the first customer, from DBMS 522. For example, event processing layer 504 may use database queries to retrieve customer policies 526 from DBMS 522. Event processing layer 504 uses customer policies 526 to process events from network device 502 on behalf of customer application 508 (and the first customer). Similarly, event processing layer 514 retrieves customer policies 528, associated with the second customer, from DBMS 522. Event processing layer 514 uses customer policies 528 to process events from network device 512 on behalf of customer application 518 (and the second customer). Although this example embodiment is described in the context of event processing layer 504 retrieving customer policies 526, 528 from DBMS 422, the invention is not limited to the DBMS context and customer policies 526, 528 may be retrieved from any type of repository.

Using this approach, event processing layers 504, 514 are identical in internal structure and logic but are configured to separately process events from network devices 502, 512, respectively, based upon the customer policies 526, 528 associated, respectively, with customer applications 508, 518 and the first and second customers.

Customer policies 526, 528 are generated in accordance with the particular requirements of customer applications 508, 518, respectively, and stored in DBMS 522. In this manner, the processing of events by event processing layers 504, 514 may vary depending upon the particular requirements of customer applications 508, 518, respectively, and may therefore be similar or dissimilar. Customer policies 526, 528 may be periodically updated to reflect changes in event processing policies of the first and second customers and customer applications 508, 518. Thus, use of different customer policies for different customers enables event processing layers 504, 514 to adapt their event cancellation behavior.

Figure 6:
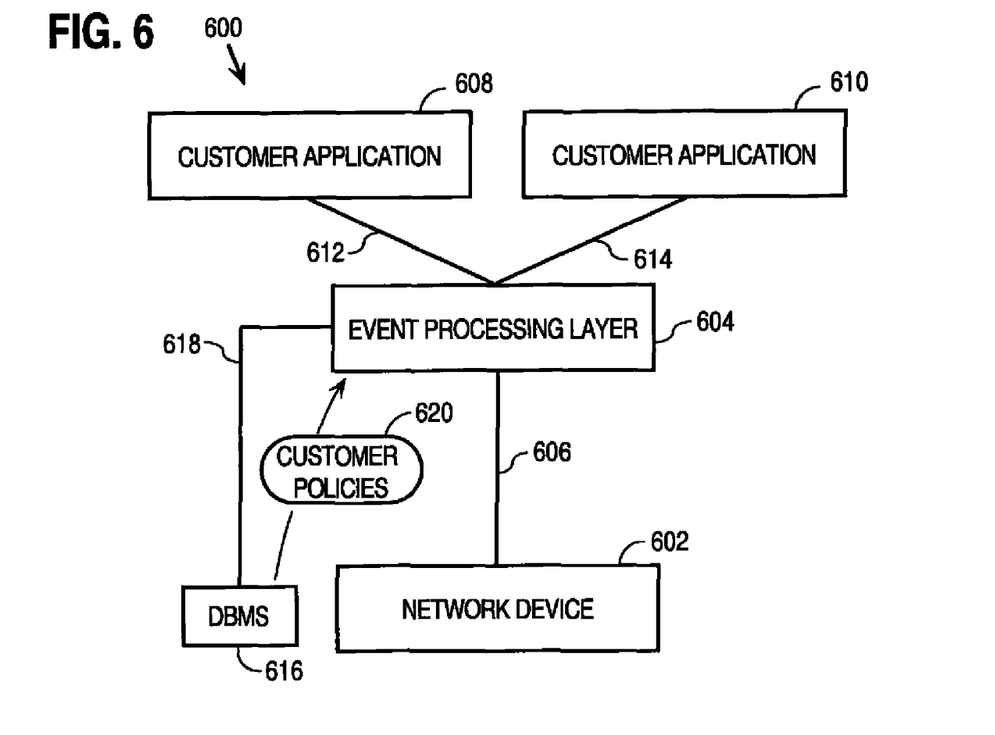
FIG. 6 is a block diagram that depicts another arrangement for canceling events using customer policies.

FIG. 6 is a block diagram that depicts an arrangement 600 for canceling events using customer policies according to another embodiment. A network device 602 is communicatively coupled to an event processing layer 604 via a link 606. Event processing layer 604 is communicatively coupled to customer applications 608, 610, associated with first and second customers, respectively, via links 612, 614, respectively. Event processing layer 604 is also communicatively coupled to a Database Management System (DBMS) 616 via a link 618. DBMS 616 stores customer policies that are used by event processing layer 604 to process events generated by network device 602. As with links 108, 112, links 606, 612, 614, 618, may be implemented by any medium or mechanism that provides for the exchange of data between their respective elements, i.e., network device 602, event processing layer 604, customer applications 608, 610 and DBMS 616.

According to one embodiment, event processing layer 604 is configured to process events using customer policies retrieved from DBMS 616. More specifically, event processing layer 604 retrieves customer policies 620, associated with customer applications 608, 610 and the first and second customers, respectively. Event processing layer 604 uses customer policies 620 to process events from network device 602 on behalf of customer applications 608, 610, and the first and second customers, respectively. Thus, events received by event processing layer 604 from network device 602 are processed using customer policies 620. Event processing layer 604 reports events to customer application 608 based upon the portion of customer policies 620 associated with customer application 608 and the first customer. Event processing layer 604 reports events to customer application 610 based upon the portion of customer policies 620 associated with customer application 610 and the second customer. Thus, event processing layer 604 may process a single event from network device 602 and separately report the event to customer applications 608, 610 according to customer policies 620. This approach provides great flexibility by allowing an event from a single source to be reported to one application, but not reported to another application, based upon the event cancellation policies specific to each application.

Customer policies 620 are generated in accordance with the particular requirements of customer applications 608, 610, respectively, and stored in DBMS 616. In this manner, the processing of events by event processing layer 604 may vary depending upon the particular requirements of customer applications 608, 610, respectively, and may therefore be similar or dissimilar. Customer policies 620 may be periodically updated to reflect changes in event processing policies of the first and second customers and customer applications 608, 610.

III. State-Based Event Cancellation

Figure 7:
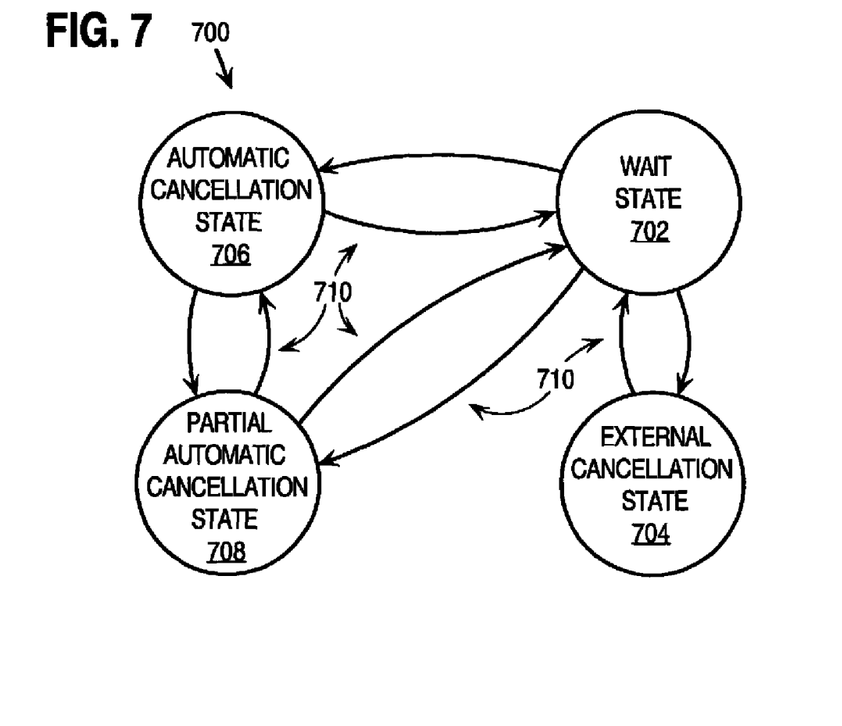
FIG. 7 is a block diagram that depicts an example state diagram for cancellation logic used to cancel events.

FIG. 7 is a block diagram that depicts an example state diagram 700 for cancellation logic used to process and cancel events according to an embodiment. State diagram 700 includes four states: a wait state 702, an external cancellation state 704, an automatic cancellation state 706 and a partial automatic cancellation state 708. Transitions between these states occurs on various conditions, as indicated generally by a set of connecting lines 710. The specific conditions under which state transitions occur are described hereinafter.

Starting in wait state 702, the native function of wait state 702 is to wait until an event is received. In wait state 702, a cancellation timer is started when an event is received. A delta value is also specified that is used to identify a set of events to be cancelled at the expiration of the cancellation timer. At the expiration of the cancellation timer, a transition is made to automatic cancellation state 706.

In automatic cancellation state 706, either all events that occurred within the specified delta are cancelled, or a transition is made to partial automatic cancellation state 708. In automatic cancellation state 706, if all events that occurred within the specified delta are cancelled, then a transition is made from automatic cancellation state 706 back to wait state 702.

In partial automatic cancellation state 708, events may be cancelled that occurred within an interval smaller than the specified delta, or only certain types of events may be cancelled. After either action, a transition is made back to wait state 702.

From wait state 702, a transition to partial automatic cancellation state 708 may be made to cancel events that occurred within an interval smaller than the specified delta, or to cancel only certain types of events.

From wait state 702, a transition to external cancellation state 704 may be made upon receipt of an external cancellation request. The external cancellation request may be received from a variety of sources, such as an application or from a network administrator. In external cancellation state 704, a variety of cancellation criteria may be used to specify a set of events to be cancelled. For example, the cancellation criteria may specify all events, events that occurred within a specified time window, all events until a specified time, events from a specified source, types of events, as well as external policies, templates and rules, such as business rules. After performing the prescribed event cancellation in external cancellation state 704, a transition is made back to wait state 702. The development of policies that may be used with external cancellation are described in "Temporal-Oriented Policy-Driven Network Management," by Manuela Popescu, Proceedings of IEEE ICT2001, Bucharest, 2001, the contents of which are incorporated herein by reference for all purposes.

State diagram 700 depicts an example set of states that may used to implement an cancellation engine or mechanism in accordance with an embodiment. The invention is not limited to the particular states depicted in state diagram 700 or the particular transition conditions described herein and the actual implementation may vary depending upon the requirements of a particular application.

IV. Implementation Mechanisms

The approach described herein for canceling events may be implemented in a variety of contexts using many different approaches and the invention is not limited to any particular context or approach. For example, the approach may be integrated into existing event processing mechanisms, such as event processing software layers, to provide additional flexibility and capabilities. As another example, the approach may be implemented into low-level devices, such as network elements. The approach may also be implemented in higher-level applications, such as network management, auditing and testing and diagnostic applications. Thus, the approach may be implemented at any layer of a hierarchical system. Alternatively, the approach may be implemented as a stand-alone mechanism that interfaces with low-level devices, event processing mechanisms and higher-level applications.

Figure 8:
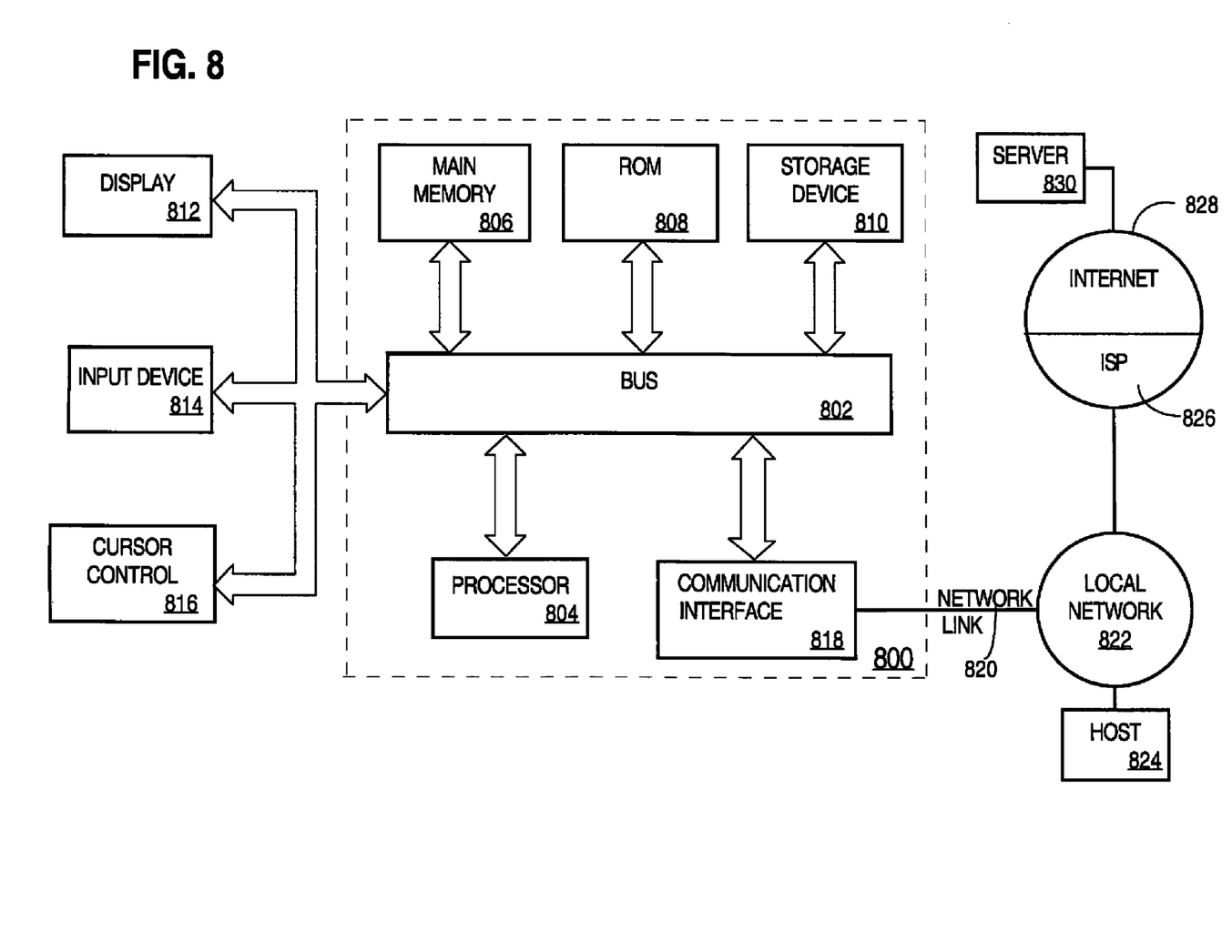
FIG. 8 is a block diagram that depicts a computer system on which embodiments may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for processing and canceling events. According to one embodiment of the invention, the processing and canceling of events is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media and volatile media. Non-volatile media includes, for example, optical or magnetic disks, such as storage device 810. Volatile media includes dynamic memory, such as main memory 806.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for the processing and cancellation of events as described herein.

The received code may be executed by processor 804 as it is received, and/or stored in storage device 810, or other non-volatile storage for later execution.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for processing events in a communications network comprising: in response to querying one or more event cancellation policies from a database management system, receiving one or more event cancellation criteria that specify one or more conditions under which events are to be cancelled; wherein the one or more event cancellation criteria include the one or more event cancellation policies; receiving, from a network device in the communications network, event data that specifies one or more attributes of an event that has occurred in the communications network; wherein the network device is the source of the event data within the communications network; determining whether the event data satisfies the one or more event cancellation criteria; if the event data satisfies the one or more event cancellation criteria, then: not providing event reporting data for the event to an application layer, and generating a request to cancel the event at the network device and sending the request to the network device over the communications network, wherein sending the request to cancel the event at the network device causes the network device to perform cancellation processing on the event; and if the event data does not satisfy the one or more event cancellation criteria, then providing, to the application layer, reporting data for processing by the application layer that specifies at least one of the one or more attributes of the event that occurred in the communications network wherein the method is performed by an event processing computing device in the communications network.

2. The method as recited in claim 1, wherein the one or more event cancellation criteria includes an event cancellation rule.

3. The method as recited in claim 1, further comprising:
   receiving one or more other event cancellation criteria that specify one or more other conditions under which events are to be cancelled;
   receiving second event data that specifies one or more attributes of a second event that has occurred in the communications network;
   determining whether the second event data satisfies the one or more other event cancellation criteria; and
   if the event data does not satisfy the one or more other event cancellation criteria, then providing to the application layer second reporting data that specifies at least one of the one or more attributes of the second event that occurred in the communications network.

4. A non-transitory computer-readable storage medium for processing events in a communications network, the non-transitory computer-readable non transitory storage medium storing one or more sequences of one or more instructions which, when executed by one or more processors, cause the one or more processors to perform:
   in response to querying one or more event cancellation policies from a database management system, receiving one or more event cancellation criteria that specify one or more conditions under which events are to be cancelled;
   wherein the one or more event cancellation criteria include the one or more event cancellation policies;
   receiving, from a network device in the communications network, event data that specifies one or more attributes of an event that has occurred in the communications network;
   wherein the network device is the source of the event data within the communications network;
   determining whether the event data satisfies the one or more event cancellation criteria;
   if the event data satisfies the one or more event cancellation criteria, then:
      not providing event reporting data for the event to an application layer, and
      generating a request to cancel the event at the network device and sending the request to the network device over the communications network,
      wherein sending the request to cancel the event at the network device causes the network device to perform cancellation processing on the event; and
   if the event data does not satisfy the one or more event cancellation criteria, then providing, to the application layer, reporting data for processing by the application layer that specifies at least one of the one or more attributes of the event that occurred in the communications network.

5. The non-transitory computer-readable storage medium as recited in claim 4, wherein the one or more event cancellation criteria includes an event cancellation rule.

6. The non-transitory computer-readable storage medium as recited in claim 4, further comprising one or more sequences of additional instructions which, when executed by the one or more processors, cause the one or more processors to perform:
receiving one or more other event cancellation criteria that specify one or more other conditions under which events are to be cancelled;
receiving second event data that specifies one or more attributes of a second event that has occurred in the communications network;
determining whether the second event data satisfies the one or more other event cancellation criteria; and
if the event data does not satisfy the one or more other event cancellation criteria, then providing to the application layer second reporting data that specifies at least one of the one or more attributes of the second event that occurred in the communications network.

7. A system configured to process events in a communications network, comprising: an event processing mechanism; one or more processors; and a non-transitory computer-readable storage medium comprising one or more stored sequences of instructions which, when executed by the one or more processors, cause the one event processing mechanism to perform: in response to querying one or more event cancellation policies from a database management system, receiving one or more event cancellation criteria that specify one or more conditions under which events are to be cancelled; wherein the one or more event cancellation criteria include the one or more event cancellation policies; receiving, from a network device, event data that specifies one or more attributes of an event that has occurred in the communications network; wherein the network device is the source of the event data within the communications network; determining whether the event data satisfies the one or more event cancellation criteria; if the event data satisfies the one or more event cancellation criteria, then the event processing mechanism: not providing event reporting data for the event to an application layer, and generating a request to cancel the event at the network device and sending the request to the network device over said communications network, wherein sending the request to cancel the event at the network device causes the network device to perform cancellation processing on the event and if the event data does not satisfy the one or more event cancellation criteria, then the event processing mechanism providing, to the application layer, reporting data for processing by the application layer that specifies at least one of the one or more attributes of the event that occurred in the communications network.

8. The system as recited in claim 7, wherein the one or more event cancellation criteria includes an event cancellation rule.

9. The system as recited in claim 7, the non-transitory computer-readable storage medium further comprising instructions which, when executed by the one or more processors, cause the event processing mechanism to perform: receiving one or more other event cancellation criteria that specify one or more other conditions under which events are to be cancelled; receiving second event data that specifies one or more attributes of a second event that has occurred in the communications network; determining whether the second event data satisfies the one or more other event cancellation criteria; and if the event data does not satisfy the one or more other event cancellation criteria, then providing to the application layer second reporting data that specifies at least one of the one or more attributes of the second event that occurred in the communications network.

10. The method as recited in claim 1, wherein the cancellation processing performed by the network device includes the network device deleting a record of the event from a local storage device of the network device.

11. The non-transitory computer-readable storage medium as recited in claim 4, wherein the cancellation processing performed by the network device includes the network device deleting a record of the event from a local storage device of the network device.

12. The system as recited in claim 7, wherein the cancellation processing performed by the network device includes the network device deleting a record of the event from a local storage device of the network device.

* * * * *

UNITED STATES PATENT AND TRADEMARK OFFICE
CERTIFICATE OF CORRECTION

PATENT NO.         : 7,853,683 B1
APPLICATION NO.    : 10/210471
DATED              : December 14, 2010
INVENTOR(S)        : Petre Dini et al.

Page 1 of 1

It is certified that error appears in the above-identified patent and that said Letters Patent is hereby corrected as shown below:

COLUMN 13
Claim 7: Line 31, after "the" and before "event", delete "one".

Signed and Sealed this
First Day of February, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,853,683 B1 | |
| APPLICATION NO. | : 10/210471 | |
| DATED | : December 14, 2010 | |
| INVENTOR(S) | : Petre Dini et al. | |

It is certified that error appears in the above-identified patent and that said Letters Patent is hereby corrected as shown below:

COLUMN 12
Claim 1: Line 14, delete "network" and insert --network;--.

Claim 4: Line 36, delete "non-transitory".

COLUMN 13
Claim 7: Line 31, after "the" and before "event", delete "one".

Signed and Sealed this
Fifteenth Day of March, 2011

David J. Kappos
*Director of the United States Patent and Trademark Office*